(12) United States Patent
Capoldi

(10) Patent No.: US 11,754,117 B2
(45) Date of Patent: Sep. 12, 2023

(54) ROLLING BEARING WITH SPRING SYSTEM

(71) Applicant: Aktiebolaget SKF, Gothenburg (SE)

(72) Inventor: Bruno Capoldi, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/586,881

(22) Filed: Jan. 28, 2022

(65) Prior Publication Data

US 2022/0243767 A1 Aug. 4, 2022

(30) Foreign Application Priority Data

Jan. 29, 2021 (DE) .......................... 102021102118.9

(51) Int. Cl.
*F16C 19/38* (2006.01)
*F16C 33/58* (2006.01)

(52) U.S. Cl.
CPC .......... *F16C 19/381* (2013.01); *F16C 33/585* (2013.01)

(58) Field of Classification Search
CPC ..... F16C 19/381; F16C 25/083; F16C 27/066
See application file for complete search history.

(56) References Cited

U.S. PATENT DOCUMENTS

| 4,906,112 | A * | 3/1990 | Gobel | F16C 19/381 |
| | | | | 384/618 |
| 9,422,923 | B2 * | 8/2016 | Frank | F16C 19/381 |
| 9,793,776 | B2 * | 10/2017 | Frank | B66C 23/84 |
| 10,738,829 | B2 * | 8/2020 | Frank | F16C 19/381 |

FOREIGN PATENT DOCUMENTS

EP 2851575 B1 5/2016

\* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A bearing includes a first ring, a second ring, at least one row of axial rolling elements, and at least one row of radial rolling elements arranged between axial raceways provided on the rings. The second ring has a protruding nose engaged into an annular groove of the first ring and provided with the axial raceway of the second ring. The bearing further includes at least one thrust ring delimiting a radial raceway for the axial rolling elements, and at least one spring system to axially push the thrust ring. The thrust ring is axially disposed between the axial rolling elements and the nose. The spring system is mounted on the nose. The groove of the first ring delimits a radial raceway for the axial rolling elements.

9 Claims, 3 Drawing Sheets

ROLLING BEARING WITH SPRING SYSTEM

CROSS-REFERENCE TO RELATED APPLICATIONS

This application claims priority to German Patent Application no. 102021102118.9, filed Jan. 29, 2021, the contents of which is fully incorporated herein by reference.

FIELD OF THE INVENTION

The present invention relates to the field of rolling bearings.

The invention notably relates to the field of large-diameter rolling bearings having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of axial and radial rollers arranged between the rings.

The rolling bearing may also be provided with a thrust ring urged against the axial rollers by spring systems to cancel an axial clearance which exists in the rolling bearing assembly, notably to limit vibration impact during operation. Such a system is known from EP 2851575 B1.

The axial rollers are preloaded, by the spring systems and the thrust ring, against a nose provided on the inner or outer ring which is named "nose ring". The spring systems are mounted on the other ring which is made into two parts, namely a supporting ring and a retaining ring. The spring systems are mounted inside through-holes formed on the retaining ring. The thrust ring is axially disposed between the axial rollers and the retaining ring.

During the rolling bearing assembly, the last step is the mounting of the retaining ring against the supporting ring and the axial rollers.

With such design of the rolling bearing, during this last step, the spring systems must be held in position with temporary screws extending inside the through-holes of the retaining ring and engaged inside threaded holes provided on pushing members of the spring systems. The temporary screws are used to retain the spring systems on the retaining ring during this final step of the rolling bearing assembly.

A large number of temporary screws are used all around the circumference of the retaining ring. The mounting and dismounting steps of the temporary screws may be laborious and increase the bearing mounting time.

Otherwise, in order to be able to drill the through-holes of the retaining ring, it is not possible to harden the radial surface of the retaining ring which axially faces the thrust ring. Therefore, to withstand the axial loads applied on the retaining ring by the axial roller and the thrust ring, the axial thickness of the portion of the retaining ring inside which are formed the through-holes for the spring systems must be adjusted accordingly.

One aim of the present invention is to overcome these drawbacks.

SUMMARY OF THE INVENTION

The invention relates to a rolling bearing comprising a first ring, a second ring, at least one row of axial rolling elements arranged between the rings, and at least one row of radial rolling elements arranged between axial raceways provided on the rings.

The terms "axial rolling elements" is understood to mean rolling elements adapted to accommodate axial loads. The terms "radial rolling elements" is understood to mean rolling elements adapted to accommodate radial loads.

The second ring comprises a protruding nose engaged into an annular groove of the first ring and provided with the axial raceway of the second ring.

The rolling bearing further comprises at least one thrust ring delimiting a radial raceway for the axial rolling elements, and at least one spring system to axially push the thrust ring against the axial rolling elements.

According to a first general feature, the thrust ring is axially disposed between the axial rolling elements and the nose of the second ring.

According to a second general feature, the spring system is mounted on the nose.

According to a third general feature, the groove of the first ring delimits a radial raceway for the axial rolling elements.

With the arrangement of the spring system on the nose of the second ring and the disposition of the thrust ring axially between this nose and the axial rolling elements, the use of temporary screws is avoided. This facilitates the assembly of the rolling bearing and reduces the bearing mounting time.

As a matter of fact, during the last step of the rolling bearing assembly, the spring system and the thrust ring are supported by the nose of the second ring.

Otherwise, thanks to the invention, it is possible to harden at least the radial raceway of the groove of the first ring. As a matter of fact, since the spring system is mounted on the nose, the first ring is deprived of hole(s) opening onto the radial raceway.

Accordingly, the axial thickness of the portion of the first ring delimiting the radial raceway can be reduced. This limits the first ring weight an enables cost saving.

A radius may be provided between the radial raceway of the groove of the first ring and an axial cylindrical surface of the groove. The radius and the axial cylindrical surface of the groove may also be hardened.

Preferably, the first ring comprises at least a supporting ring and a retaining ring stacked one relative to the other in the axial direction, the radial raceway of the groove of the first ring being provided on the retaining ring.

The spring system may be mounted into a hole provided on the nose of the second ring. Preferably, the hole is a blind-hole.

The nose of the second ring may be provided with an axial cylindrical surface onto which is formed the axial raceway of the second ring, In one embodiment, the spring system is provided with a pushing member and with at least one spring element exerting an axial force oriented axially outwards and urging the pushing member against the thrust ring.

In one embodiment, the rolling bearing comprises at least two rows of axial rolling elements being disposed axially on both sides of the nose of the second ring.

In one embodiment, the first ring is the outer ring and the second ring is the inner ring. Alternatively, the first ring may be the inner ring and the second ring may be the outer ring.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
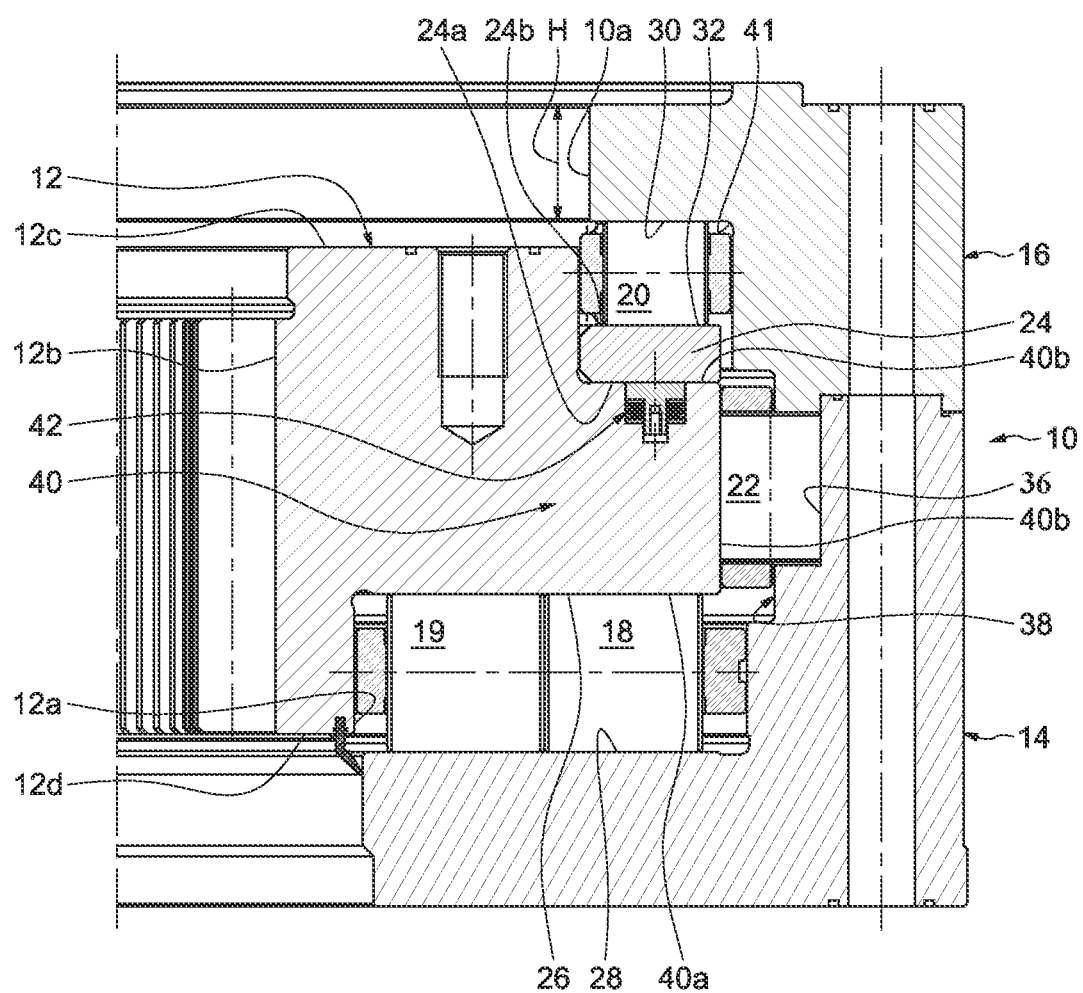
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. In the illustrated example, the rings 10, 12 are of the solid type.

The outer ring 10 is formed as a split ring and comprises a first supporting ring 14 and a second retaining ring 16 stacked one relative to the other in the axial direction. Each of the supporting and retaining rings 14, 16 of the outer ring is provided with a plurality of aligned through-holes (not referenced) in order to be joined by fitting bolts.

In the illustrated example, the rolling bearing comprises three rows of axial rollers 18, 19, 20 which are arranged between the outer and inner rings 10, 12 in order to form an axial thrust, and a row of radial rollers 22 which are arranged between the rings to form a radial thrust.

As will be described later, the rolling bearing also comprises a thrust ring 24 axially mounted between the row of axial rollers 20 and the inner ring 12. Such a thrust ring 24 may be named "elastic ring".

The rollers 18, 19, 20, 22 of one row are identical to one another. Each roller 18, 19, 20, 22 comprises a cylindrical outer rolling surface. The axis of rotation of each roller 22 is parallel to the axis of the bearing and perpendicular to the axes of each of the rollers 18, 19, 20. In the illustrated example, the row of rollers 18 is superimposed on the row of rollers 19. Alternatively, the two rows of rollers 18, 19 may be replaced by one row of rollers.

The rollers 18, 19 are arranged axially between annular radial raceways 26, 28 respectively formed on the inner and outer rings 12, 10. The radial raceway 28 is formed on the supporting ring 14 of the outer ring. The raceways 26, 28 face each other in the axial direction.

The rollers 20 are arranged axially between annular radial raceways 30, 32 respectively formed on the outer ring 10 and the thrust ring 24. The radial raceway 30 is formed on the retaining ring 16 of the outer ring. The raceways 30, 32 axially face each other. The rows of rollers 18, 19 and the row of rollers 20 are spaced apart from each other in the axial direction.

The rollers 22 are arranged radially between annular axial raceways 34, 36 respectively formed on the inner and outer rings 12, 10. The radial raceway 36 is formed on the supporting ring 14 of the outer ring. The raceways 34, 36 face each other in the radial direction. The row of rollers 22 is radially offset outwards with respect to the rows of rollers 18, 19, 20. The row of rollers 22 is axially located between the rows of rollers 18, 19, 20.

The outer ring 10 comprises an annular groove 38 opening in a radial direction inwardly towards the inner ring 12. The outer ring 10 comprises an inner stepped cylindrical surface or bore 10a from which the groove 38 is formed.

The inner ring 12 comprises an annular protruding nose 40 engaging into the annular groove 38 of the outer ring. The nose 40 extends radially outwards. The nose 40 protrudes radially from an outer cylindrical surface 12a of the inner ring.

The inner ring 12 also comprises an inner cylindrical bore 12b which is radially opposite to the outer cylindrical surface 12a. In the illustrated example, the bore 12b of the inner ring is provided with a gear teeth (not referenced). The inner ring 12 further comprises two opposite radial frontal faces 12c, 12d which axially delimit the outer cylindrical surface 12a and the bore 12b.

The rows of rollers 18, 19, 20 are arranged axially between the nose 40 of the inner ring and the groove 38 of the outer ring. The rows of rollers 18, 19 are disposed on one side of the nose 40, and the row of rollers 20 is disposed on the other side.

The radial raceway 26 is located on the nose 40. A first radial flank 40a of the nose delimits the radial raceway 26. The thrust ring 24 axially abuts against a second radial flank 40b of the nose 40. The opposite first and second flanks 40a, 40b of the nose delimit axially the nose. The radial raceways 28, 30 are located on the groove 38 of the outer ring. The radial raceway 32 is located on the thrust ring 24.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. An axial bottom of the groove 38 delimits the axial raceway 36. The axial raceway 36 radially faces the outer cylindrical surface of the nose 40 onto which is formed the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks 40a, 40b of the nose.

Advantageously, the radial raceway 30 formed on the groove 38 of the outer ring may be hardened. The radial raceway 30 is formed on the retaining ring 16 of the outer ring. For example, a heat-treatment may be applied to obtain a surface hardness at least equal to 55 HRc.

Since the radial raceway 30 is hardened, the axial thickness H of the portion of the retaining ring 16 delimiting this raceway can be reduced. Preferably, the radius 41, which is provided between the radial raceway 30 formed on the groove 38 of the outer ring and an axial cylindrical surface of the groove, and this axial cylindrical surface may also be hardened.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the supporting ring 14 and the retaining ring 16. The supporting and retaining rings 14, 16 delimit together the groove 38.

As previously mentioned, the thrust ring 24 is axially mounted between the axial rollers 20 and the inner ring 12. The thrust ring 24 is axially disposed between the axial rollers 20 and the nose 40 of the inner ring. The thrust ring 24 axially abuts against the nose 40.

The thrust ring 24 is mounted around the inner ring 12. The thrust ring 24 is mounted inside the groove 38 of the outer ring. The thrust ring 24 is freely movable in translation with regard to the outer and inner rings 10, 12.

The thrust ring 24 is provided with two opposite radial frontal faces 24a, 24b which axially delimit the thickness of the ring. The frontal face 24b of the thrust ring delimits the radial raceway 32. The radial raceway 32 is in contact with the outer rolling surface of each roller 20. The frontal face 24a of the thrust ring axially abuts against the nose 40 of the inner ring.

The rolling bearing further comprises a plurality of spring systems 42 to axially push the thrust ring 24 against the axial rollers 20. The spring systems 42 are mounted on the nose 40 of the inner ring. The spring systems 42 are distributed around the circumference of the thrust ring 24. Preferably, the spring systems 42 are equally angularly spaced with respect to each other. The spring systems 42 are identical to each other. Since the spring systems 42 are identical, only one of them will be described here.

Figure 2:
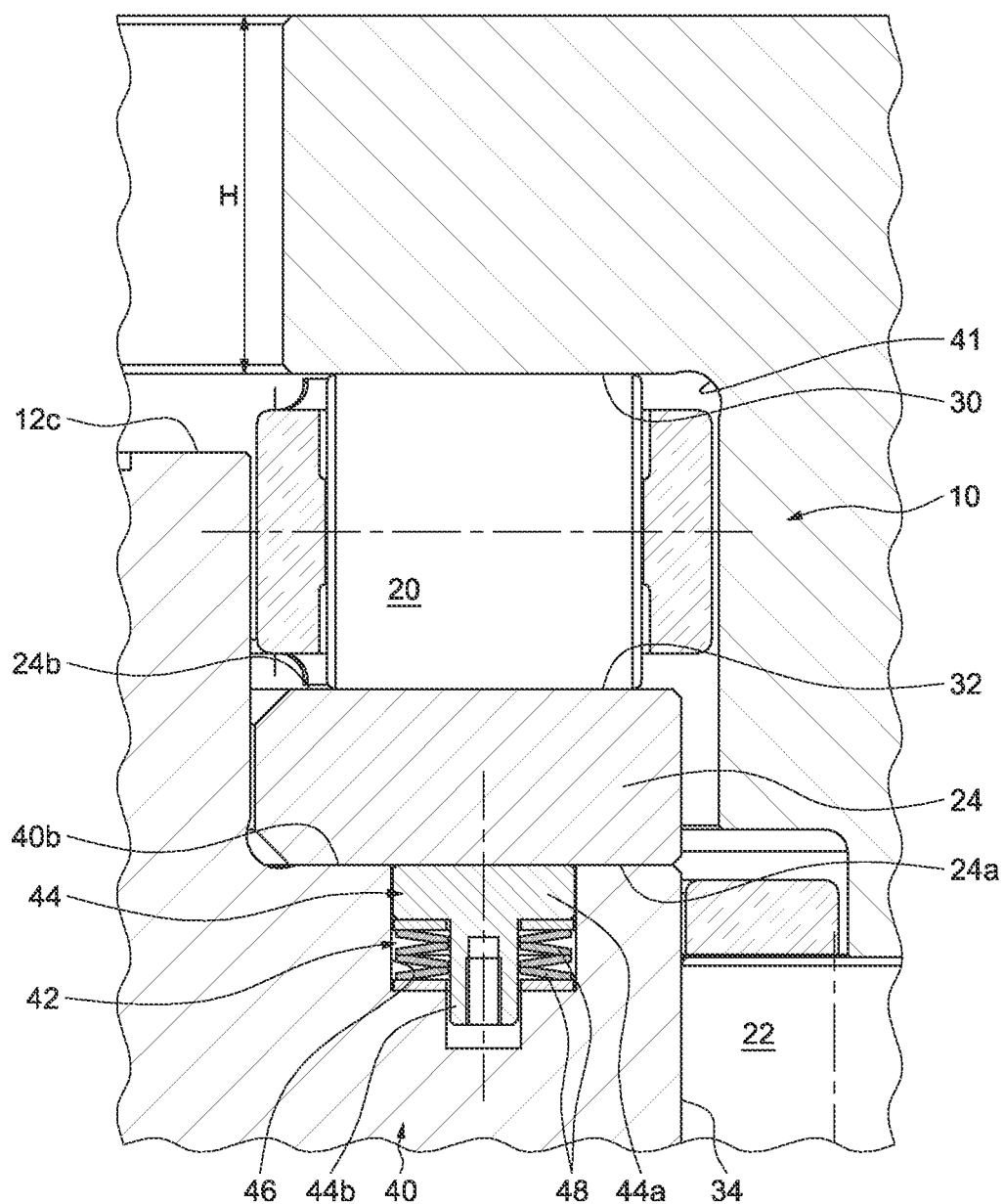
FIG. 2 is a detail view of FIG. 1.

As shown more clearly on FIG. 2, the spring system 42 is provided with a pushing member 44 engaged inside a hole 46 formed on the nose 40 of the inner ring. The pushing member 44 comes into axial contact with the thrust ring 24 axially on the side opposite to the rollers 20. The pushing member 44 comes into axial contact with the frontal face 24a of the thrust ring 24.

In the illustrated example, the thrust ring 24 axially abuts against the pushing member 44 and the radial flank 40b of the nose 40. Alternatively, the pushing member 44 may axially protrude with regard to the radial flank 40b of the nose. In this case, the thrust ring 24 axially abuts against the pushing member 44 and remains axially spaced apart from the radial flank 40b of the nose 40.

The pushing member 44 comprises a piston 44a axially coming into contact against the thrust ring 24. The piston 44a axially comes into contact against the frontal face 24a of the thrust ring. The pushing member 44 also comprises a rod 44b extending axially the piston 44a axially on the side opposite to the rollers 20. Preferably, the pushing member 44 is made into one part.

The hole 46 of the nose 40 of the inner ring extends axially. The hole 46 extends axially from the radial flank 40b of the nose. The hole 46 axially faces the thrust ring 24.

The spring system 42 is also provided with elastic washers 48 exerting an axial pre-stressing permanent force on the pushing member 44 so as to ensure an axial contact between the thrust ring 24 and the rollers 20. The axial pre-stressing permanent force is oriented axially outwards. The washers 48 are mounted around the rod 44b of the pushing member 44. The washers 48 are axially disposed between the piston 44a of the pushing member and the radial shoulder of the hole 46.

In the illustrated example, the elastic washers 48 are Belleville washers. Alternatively, it could be possible to provide other pre-stressing element to exert a permanent axial force on the thrust ring 24, for example a compression spring. In the illustrated example, a first flat washer (not referenced) is axially interposed between the spring washers 48 and the nose 40 of the inner ring, and a second flat washer (not referenced) is axially interposed between the spring washers 48 and the pushing member 44. Alternatively, it could be possible to not foresee such flat washers.

In use, the axial force exerted by each spring system 42 permits to push the thrust ring 24 onto the axial rollers 20 and to cancel an axial clearance which exists in the rolling bearing assembly. The thrust ring 24 is axially preloaded by the washers 48 of the spring systems. The initial axial clearance of the rolling bearing is cancelled. There is no possibility of axial relative displacements between the outer and inner rings 10, 12.

In the illustrated example, the thrust ring 24 is axially provided between the nose 40 of the inner ring and the row of axial rollers 20. Alternatively, or in combination, the rolling bearing could be provided with a thrust ring disposed axially between the nose 40 of the inner ring, and the row of axial rollers 18 and/or the row of axial rollers 19, and with associated spring systems similar to the one described for the thrust ring 24.

Otherwise, as previously mentioned, in this example, the first ring of the rolling bearing is the fixed outer ring 10 whereas the second ring is the rotative inner ring 12.

Figure 3:
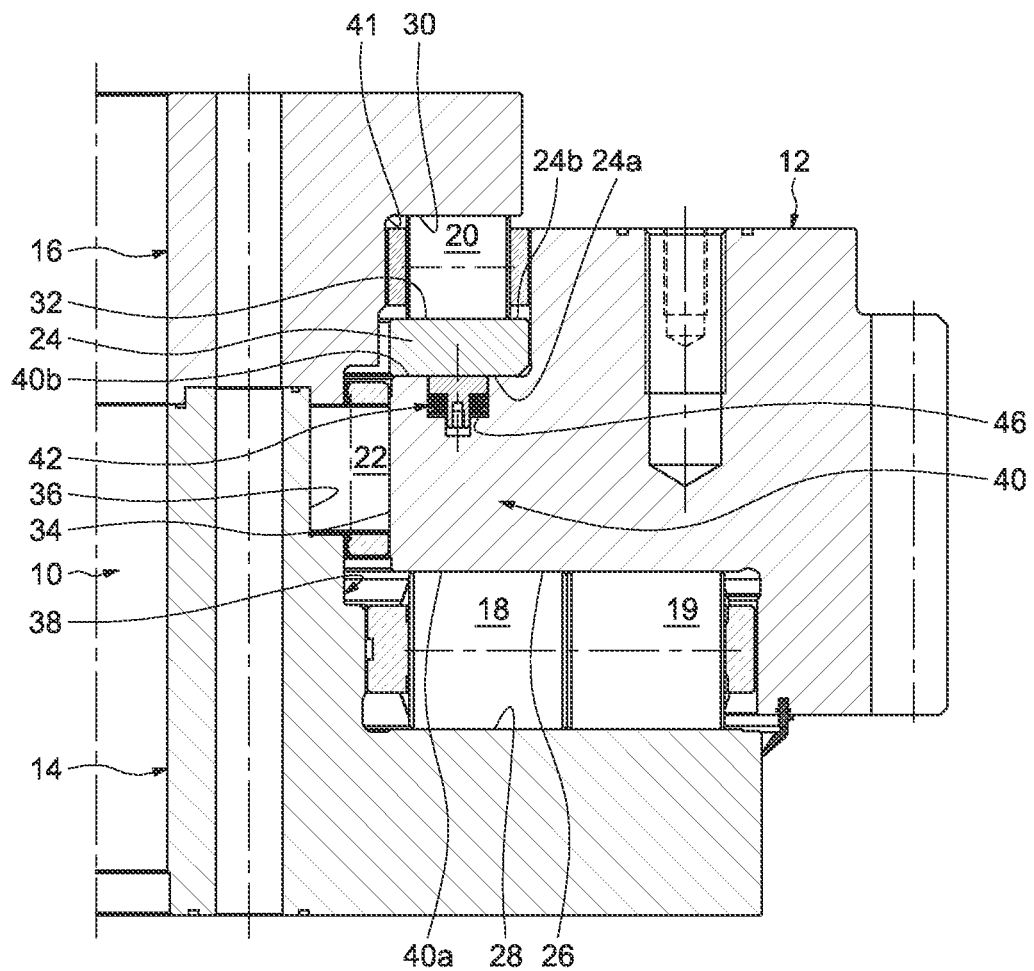
FIG. 3 is a partial cross-section of a rolling bearing according to a second example of the invention.

As an alternative, it could be possible to provide a reversed arrangement with the first ring forming the fixed inner ring 10 and the second ring forming the rotative outer ring 12 as shown on FIG. 3.

The outer ring 12 is provided with the protruding nose 40 which extends radially inward. The groove 38 is formed on the inner ring 10 and opens radially outwards. The nose 40 engages into the groove 38.

Here, the axial raceway 34 is formed on an axial inner cylindrical surface of the nose 40, which forms the bore of the nose. The radial raceway 36 is formed on the supporting ring 14 of the inner ring.

The thrust ring 24 is mounted axially between the row of axial rollers 20 and the nose 40 which here is provided on the outer ring 12. The spring systems 42 are also mounted on the nose 40 as it is the case in the first example. In this example, the radial raceway 30 is formed on the inner ring 10. The radial raceway 30 is formed on the retaining ring 16 of the inner ring. The radial raceway 28 is formed on the inner ring 10. The radial raceway 28 is formed on the supporting ring 14 of the inner ring.

In the illustrated examples, the rolling bearing is provided with four rows of rolling elements. Alternatively, the rolling bearing may comprise only two rows of rolling elements, or three rows of rolling elements, or five or more rows of rolling elements. In the illustrated example, the rolling elements are rollers. The rolling bearing may comprise other types of rolling elements, for example balls.

The invention claimed is:
1. A rolling bearing comprising:
a first ring,
a second ring,
at least one row of axial rolling elements arranged between the first ring and the second ring, and
at least one row of radial rolling elements arranged between axial raceways provided on the rings, the second ring comprising a protruding nose engaged into an annular groove of the first ring and provided with the axial raceway of the second ring,
at least one thrust ring delimiting a radial raceway for the axial rolling elements, and
at least one spring system to axially push the thrust ring against the axial rolling elements, wherein
the thrust ring is axially disposed between the axial rolling elements and the nose of the second ring and the spring system is mounted on the nose, the groove of the first ring delimiting a radial raceway for the axial rolling elements, wherein a radius is provided between the radial raceway of the groove of the first ring and an axial cylindrical surface of the groove, the radial raceway, the radius and the axial cylindrical surface of the groove being hardened.

2. The rolling bearing according to claim 1, wherein the first ring comprises at least a supporting ring and a retaining ring stacked one relative to the other in an axial direction, the radial raceway of the groove of the first ring being provided on the retaining ring.

3. The rolling bearing according to claim 1, wherein the spring system is mounted into a hole provided on the nose of the second ring.

4. The rolling bearing according to claim 1, wherein the nose of the second ring is provided with an axial cylindrical surface onto which is formed the axial raceway of the second ring.

5. The rolling bearing according to claim 1, wherein the spring system is provided with a pushing member and with at least one spring element exerting an axial force oriented axially outwards and urging the pushing member against the thrust ring.

6. The rolling bearing according to claim 1, wherein the at least one row of axial rolling elements comprises a first row of axial rolling elements and a second row of axial rolling elements, wherein the first row of axial rolling elements is disposed axially on one side of the nose of the second ring and the second row of axial rolling elements is disposed axially on an opposite side of the nose of the second ring.

7. The rolling bearing according to claim 1, wherein the first ring is an outer ring, and the second ring is an inner ring.

8. The rolling bearing according to claim 1, wherein the first ring is an inner ring, and the second ring is an outer ring.

9. A rolling bearing comprising:

a first ring, a second ring, at least one row of axial rolling elements arranged between the first ring and the second ring, and at least one row of radial rolling elements arranged between axial raceways provided on the rings, the second ring comprising a protruding nose engaged into an annular groove of the first ring and provided with the axial raceway of the second ring, at least one thrust ring delimiting a radial raceway for the axial rolling elements, and at least one spring system to axially push the thrust ring against the axial rolling elements, wherein the thrust ring is axially disposed between the axial rolling elements and the nose of the second ring and the spring system is mounted on the nose, the groove of the first ring delimiting a radial raceway for the axial rolling elements, wherein a radius is provided between the radial raceway of the groove of the first ring and an axial cylindrical surface of the groove, the radial raceway, the radius and the axial cylindrical surface of the groove being hardened, wherein the spring system is mounted into a hole provided on the nose of the second ring, and wherein the nose of the second ring is provided with an axial cylindrical surface onto which is formed the axial raceway of the second ring.

\* \* \* \* \*